US008020607B2

(12) United States Patent  (10) Patent No.: US 8,020,607 B2
Kim et al.  (45) Date of Patent: Sep. 20, 2011

(54) HEAT EXCHANGER HAVING A HEADER

(75) Inventors: Ki-Hun Kim, ChonAn (KR); Yong-Ki Baek, ChonAn (KR); Hyeong-Ki Kim, ChonAn (KR)

(73) Assignee: Modine Korea, LLC, Chungham (KR)

( * ) Notice: Subject to any disclaimer, the term of this patent is extended or adjusted under 35 U.S.C. 154(b) by 446 days.

(21) Appl. No.: 12/106,015

(22) Filed: Apr. 18, 2008

(65) Prior Publication Data

US 2008/0302521 A1  Dec. 11, 2008

(30) Foreign Application Priority Data

Apr. 23, 2007 (KR) .................. 10-2007-0039421

(51) Int. Cl.
*F28F 9/16* (2006.01)
(52) U.S. Cl. ..................... 165/79; 165/173; 165/178
(58) Field of Classification Search ............ 165/79, 165/173, 178; 29/890.043, 890.054
See application file for complete search history.

(56) References Cited

U.S. PATENT DOCUMENTS

| 3,708,012 | A | * | 1/1973 | Zimprich | 29/890.043 |
| 5,381,858 | A | * | 1/1995 | Fredrich | 165/79 |
| 5,605,191 | A | * | 2/1997 | Eto et al. | 165/79 |
| 5,711,369 | A | * | 1/1998 | Huddleston et al. | 165/79 |
| 5,842,515 | A | * | 12/1998 | Kim | 165/175 |
| 5,934,366 | A | * | 8/1999 | Gowan | 165/173 |
| 6,123,143 | A | * | 9/2000 | Insalaco | 165/79 |
| 7,044,209 | B2 | * | 5/2006 | Petersen | 165/173 |
| 2007/0204982 | A1 | * | 9/2007 | Barnes et al. | 165/173 |

FOREIGN PATENT DOCUMENTS

| JP | 63003194 | 1/1988 |
| JP | 63003195 | 1/1988 |
| JP | 2504892 | 5/1996 |
| JP | 10038493 | 2/1998 |

* cited by examiner

*Primary Examiner* — Leonard Leo
(74) *Attorney, Agent, or Firm* — Michael Best & Friedrich LLP (57) ABSTRACT

The present invention provides a pipe for a heat exchanger. The header includes a tube insertion hole for insertion of a tube, a filler metal groove formed in a length direction on one side or both sides at a point separated from the tube insertion hole, and a filler metal that flows down following the tube and the periphery where the tube and tube insertion hole come in contact. Filler metal is inserted in the filler metal groove so as to enable brazing fusion. A lead groove is formed between the tube insertion hole and filler metal groove and provides a pathway so as to enable smooth flow of the filler metal, and so that molten filler metal can flow smoothly into the fused areas between the tube and header pipe in desired locations and amounts.

11 Claims, 9 Drawing Sheets

HEAT EXCHANGER HAVING A HEADER

CROSS-REFERENCE TO RELATED APPLICATIONS

Priority is hereby claimed to Korean Patent Application No. 10 2007 0039421, filed Apr. 23, 2007, the entire contents of which is incorporated herein by reference.

FIELD OF THE INVENTION

The present invention relates to a header pipe used for a heat exchanger, and more specifically, to a header pipe for a heat exchanger having a filler metal groove that can easily fuse between the header pipe and tube by brazing.

SUMMARY

For the header pipe of a heat exchanger used for air conditioning, etc., a plurality of tube insertion holes are generally processed, and, after a tube for refrigerant circulation is assembled therein, radiating fins are assembled and fused by brazing.

Thus, a heat exchanger fused by brazing maintains its sealed state so a refrigerant is circulated through the header pipe and tube, and heat transfer takes place to radiating fins following a heat transfer process with radiating fins during refrigerant circulation, and it functions as a heat exchanger based on the heat exchange process between the radiating fins and external air. In such a heat exchanger, its header pipe is used as a pathway in which the inflow and outflow of a refrigerant can take place so its role is very important and may be an essential part in a heat exchanger.

As described above, while the header pipe for a heat exchanger has been used as the mode in which a clad sheet material in which a brazing filler metal has been clad in advance for brazing with a plurality of tubes and while it has been formed in a circle, and its joints are welded after a tube insertion hole for tube insertion is processed by pressing it, a problem arises where if a raw material in which a brazing filler metal has been clad in advance is used, its cost increases greatly.

In order to solve the problem above, as disclosed in the Korean Patent Publication No. 1995-0009505 (Aug. 23, 1995), instead of using a clad sheet material with a clad filler metal, a header pipe in circle shape, oval shape, etc. that is formed by an extrusion or extrusion drawing process, and as such a header pipe does not have a clad filler metal, a tube insertion hole is processed, and then a separate filler metal is processed for brazing and assembled with a header pipe that is formed by extrusion or extrusion drawing with a processed tube insertion hole before it is used.

However, if a brazing filler metal is separately processed and used, additional processing and assembly expenses are added, so the effects of cost reduction are not great compared to the case in which a clad sheet material in which brazing filler metal has been clad in advance. To solve the problem above, as disclosed in the U.S. Pat. No. 6,880,744 (Apr. 19, 2005), the scheme is applied in which a tube insertion hole is processed into an extrusion molded header pipe in which a brazing filler metal has not been clad in advance, and a plurality of tubes and radiating fins are assembled herein, before a paste-type filler metal for brazing is coated on the assembled part of a header pipe and a tube prior to the introduction into a brazing furnace.

However, in order to apply the scheme above, a paste-type filler metal must be coated on the assembled part of a header pipe with a tube right before a heat exchanger assembled for furnace brazing is introduced into a furnace, so if coating location and quantity are not uniform, defects occur. If a header pipe needs to undergo sub-assay and be supplied for cost reduction, its transport process causes significant difficulties, so it is an engineering technique that can be applicable for vendors that must employ the brazing of a heat exchanger only.

The current method of brazing by supplying a filler metal to the assembled part of a header pipe with a tube is described as follows. In the first method, a sheet material with an already-clad filler metal is formed into a circle before a sealed pipe whose joints have been welded is used. In the second method, a header pipe formed by extrusion or extrusion drawing is assembled with a filler metal plate of aluminum No. 4000 series that has been press processed. In the third method, a header pipe formed by extrusion or extrusion drawing is assembled with tubes and radiating fins, and then a paste type filler metal is coated on the assembled part of a header pipe with a tube prior to the introduction into a brazing furnace.

However, in the first brazing method, if a sheet material in which No. 3000 series aluminum and a filler metal of No. 4000 series have been clad in advance by hot rolling and cold rolling processes is used to form it into a circular shape, and its joints are welded, the problem of higher raw material cost arises; in the second brazing method, a filler metal plate of No. 4000 series aluminum is pressed so that it may be assembled into the tube insertion hole of a header pipe, and then assembled with the header pipe, so the problem of higher processing and assembly cost arises; and in the third brazing method, a paste type filler metal must be coated on the assembled part of a header pipe with a tube on a conveyor right before the introduction into a brazing furnace, and it is difficult to coat at the right locations and at right amounts so the problem of increasing cost due to defects arises.

Therefore, the present invention was conceived to solve the various problems that exist as described above and is intended to provide the header pipe for a heat exchanger furnished with a filler metal groove that enables fusing the assembled part of a header pipe with a tube easily by brazing and to improve on the assembly of a header pipe with a tube and brazing performance.

The present invention includes a tube insertion hole for insertion of a tube, a header pipe on which a filler metal groove is formed in a length direction on one side or both sides at a point separated from the inlet of the tube insertion hole; and a filler metal that flows down following the tube and the periphery where the tube and tube insertion hole come in contact is inserted and installed in the filler metal groove so as to enable brazing fusion that is furnished with a filler metal groove during temperature increase, wherein a lead groove is formed providing a pathway between the tube insertion hole and filler metal groove so that the smooth flow of the filler metal can take place.

As described above, the present invention has the advantage of improving on the assembly and fusion characteristics and greatly decreasing defect rates due to brazing fusion because a molten filler metal can smoothly flow onto the fused part of a tube with a header pipe at the right locations and amounts.

In addition, it can reduce the raw material cost compared with the existing scheme in which a sheet material with an already-clad filler metal is used, and a filler metal in a paste state is not pressed so press processing cost may be reduced. It is available in the market, and a welding rod or paste material whose material cost is low if purchased in large quantities is used so it has the advantage of cost reduction.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
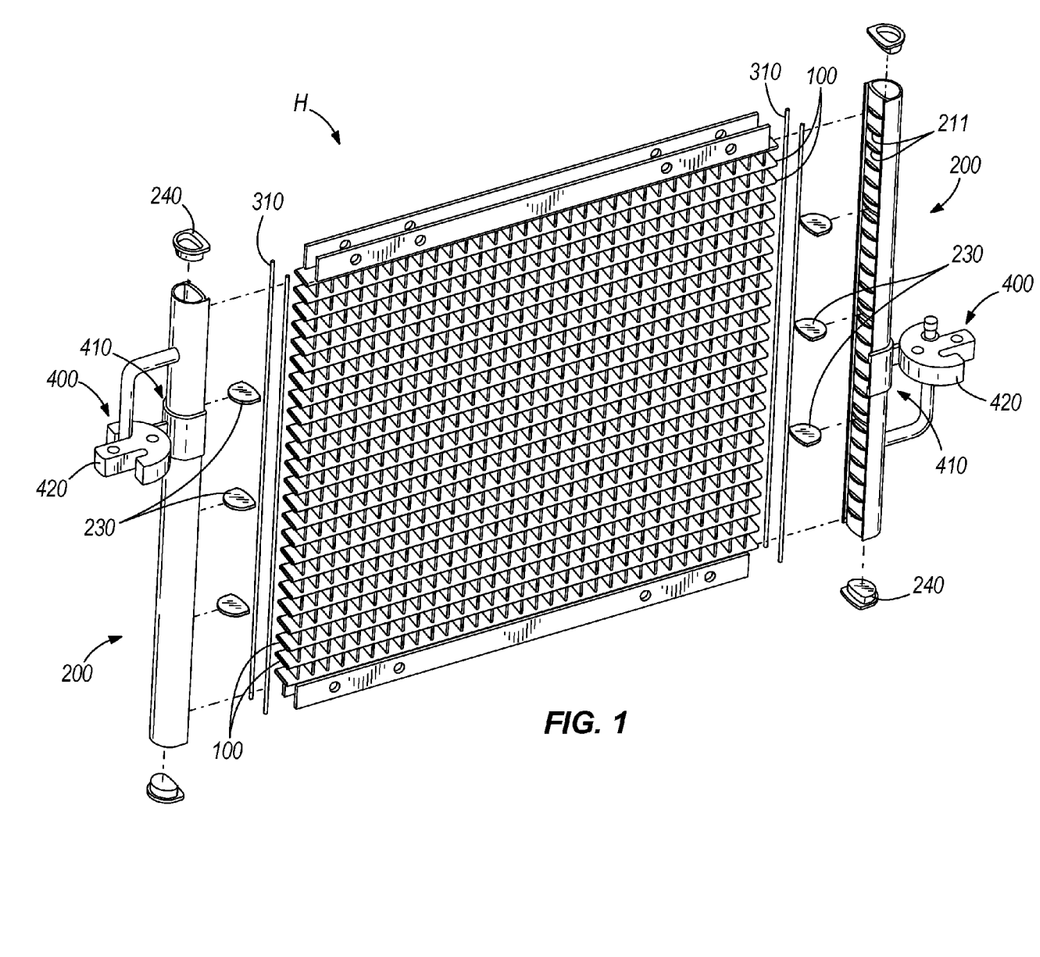
FIG. 1 is an exploded perspective view of a heat exchanger according to some embodiments of the present invention.
Figure 2:
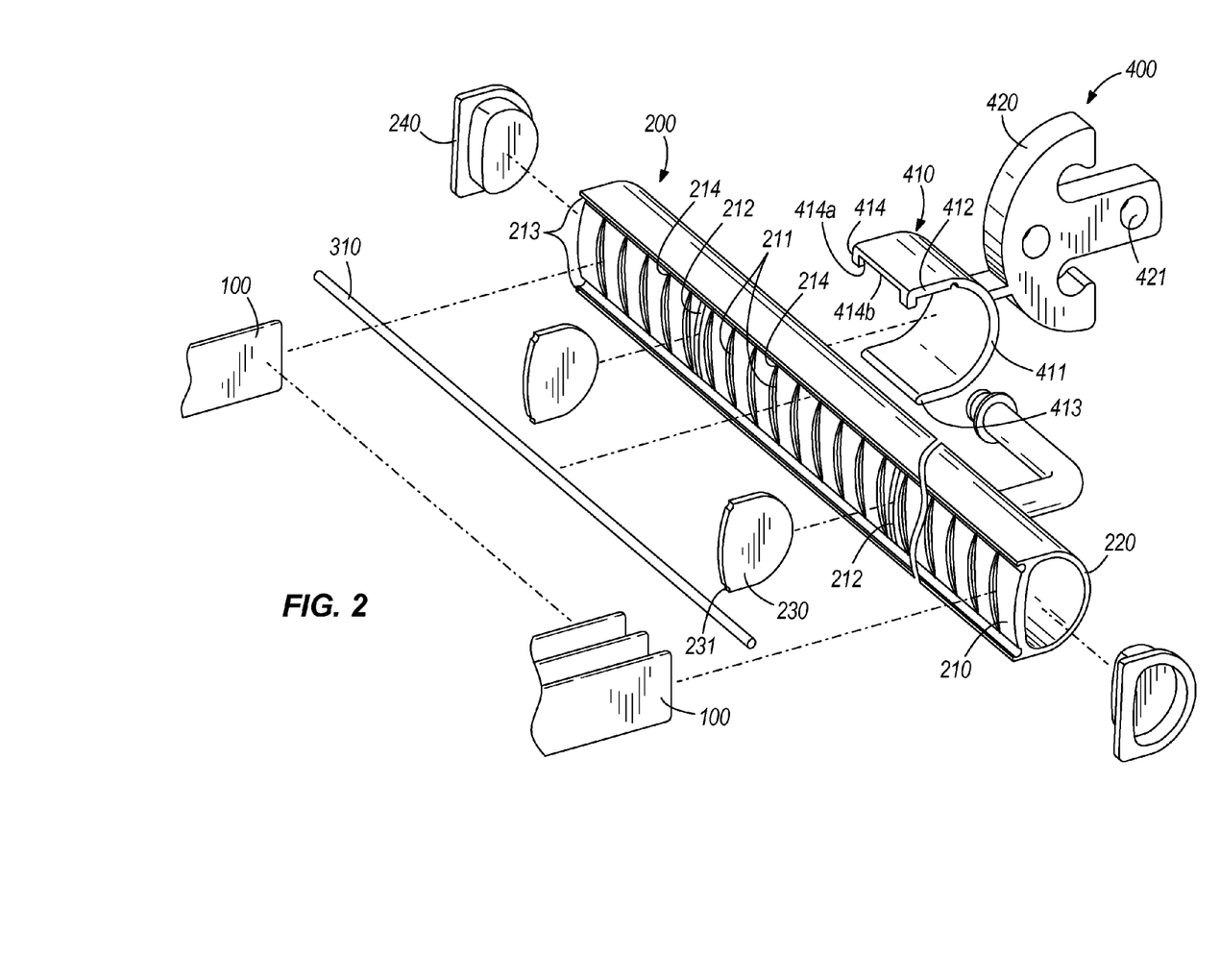
FIG. 2 is an enlarged exploded perspective view of a portion of the heat exchanger of FIG. 1.

FIG. 1 is an exploded perspective view showing the configuration of the heat exchanger to which the present invention is applied, and FIG. 2 is a perspective view illustrating an enlarged part of FIG. 1.

Figure 3:
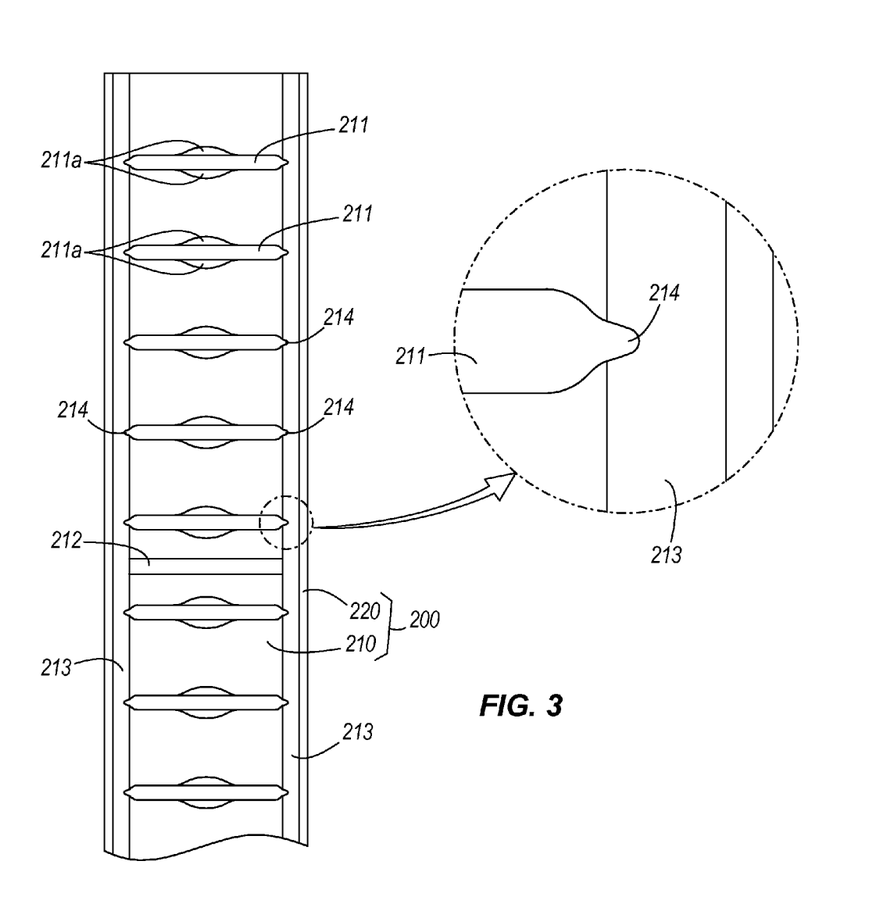
FIG. 3 is a front view of a header pipe of the heat exchanger shown in FIG. 1.
Figure 4:
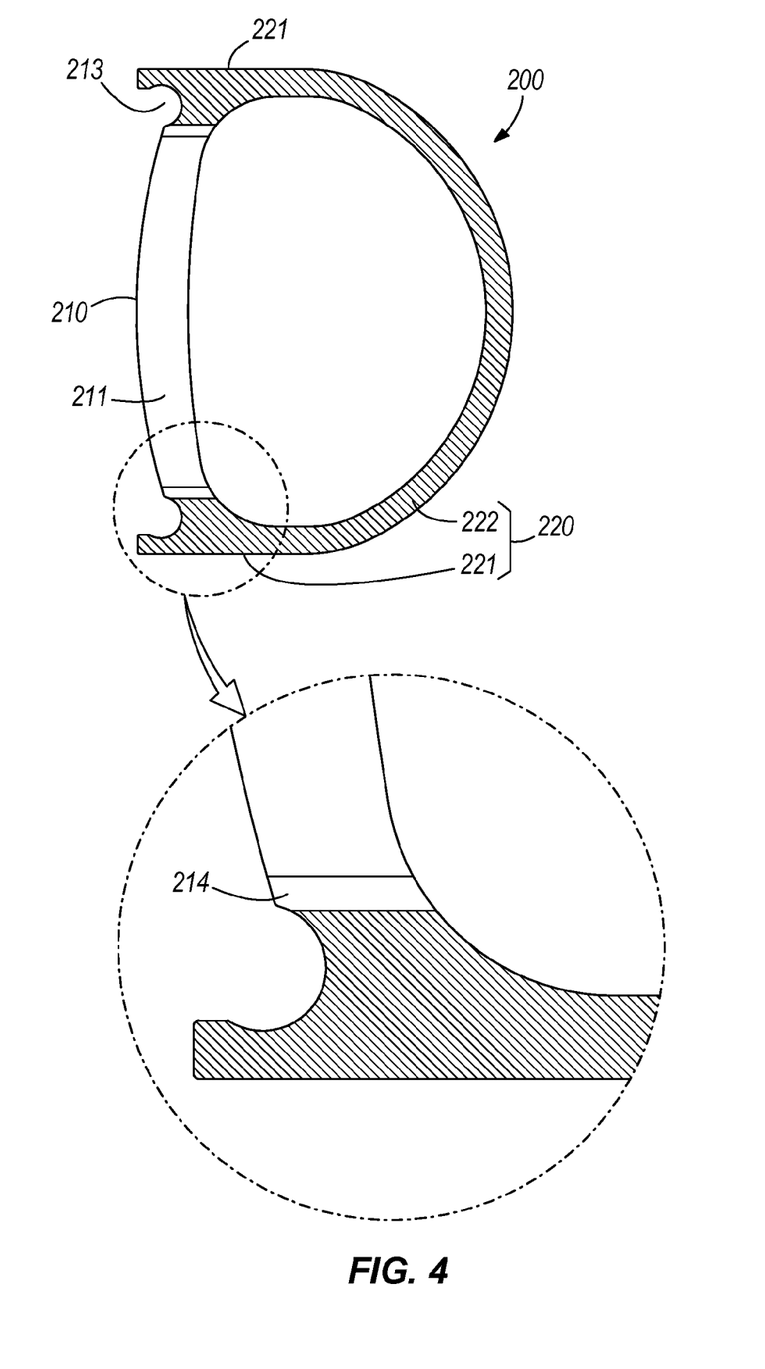
FIG. 4 is a cross-sectional view of the header pipe shown in FIG. 3.
Figure 5A:
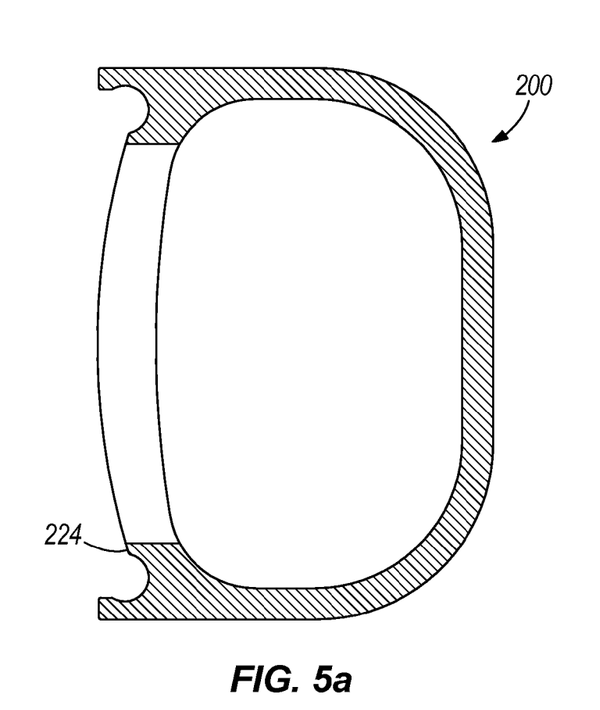
FIGS. 5a and 5b are cross-sectional views showing other shapes of the header pipe.
Figure 5B:
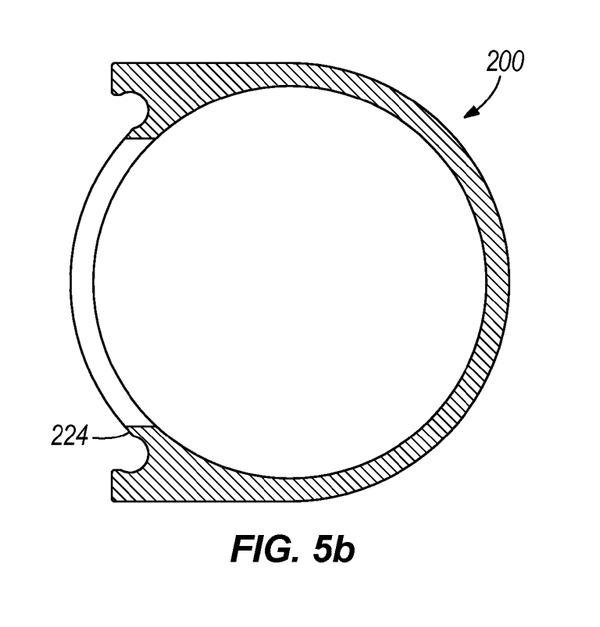
Figure 6:
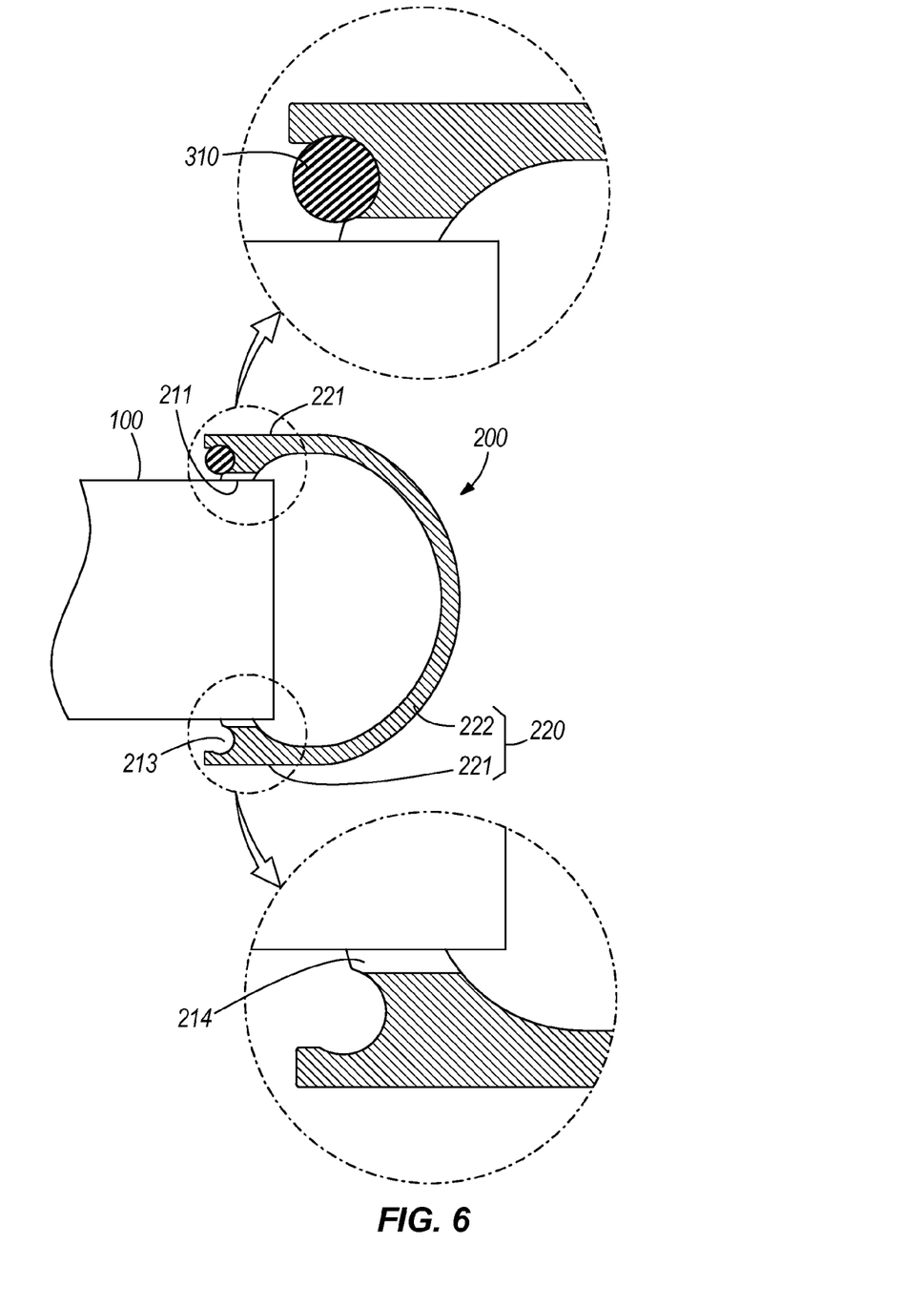
FIG. 6 is an enlarged cross-sectional view illustrating enlarged key parts of a header pipe.
Figure 7:
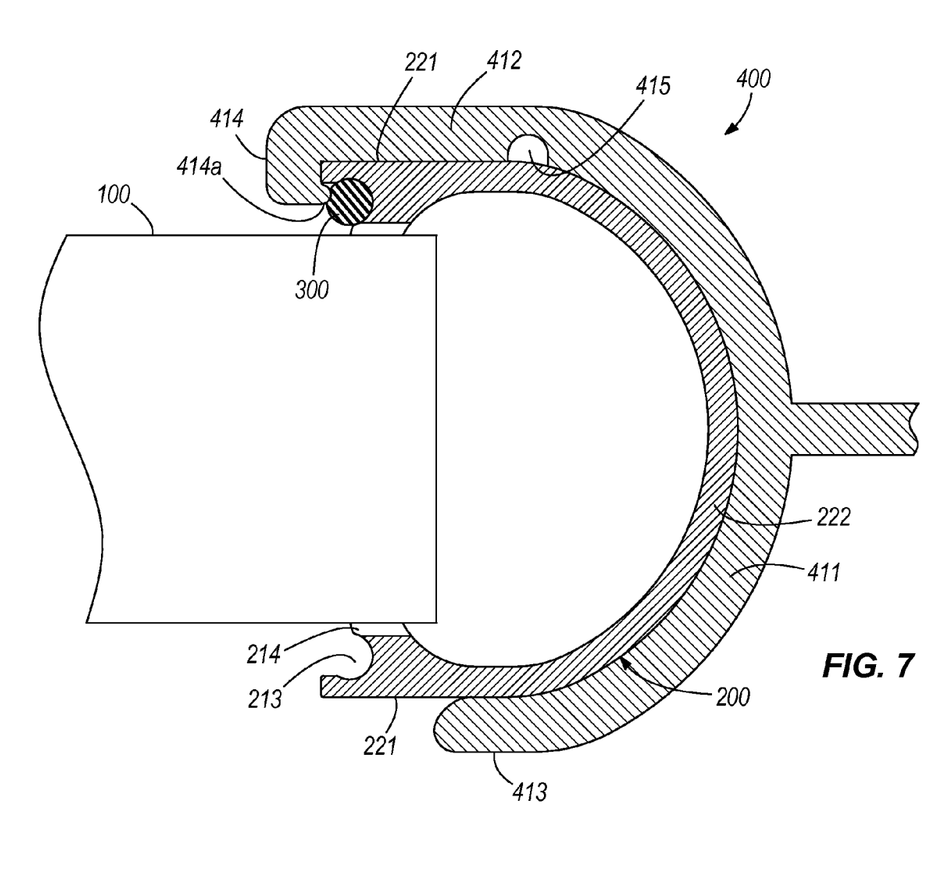
FIG. 7 is a cross-sectional view showing the joined structure of a header pipe and a bracket.
Figure 8:
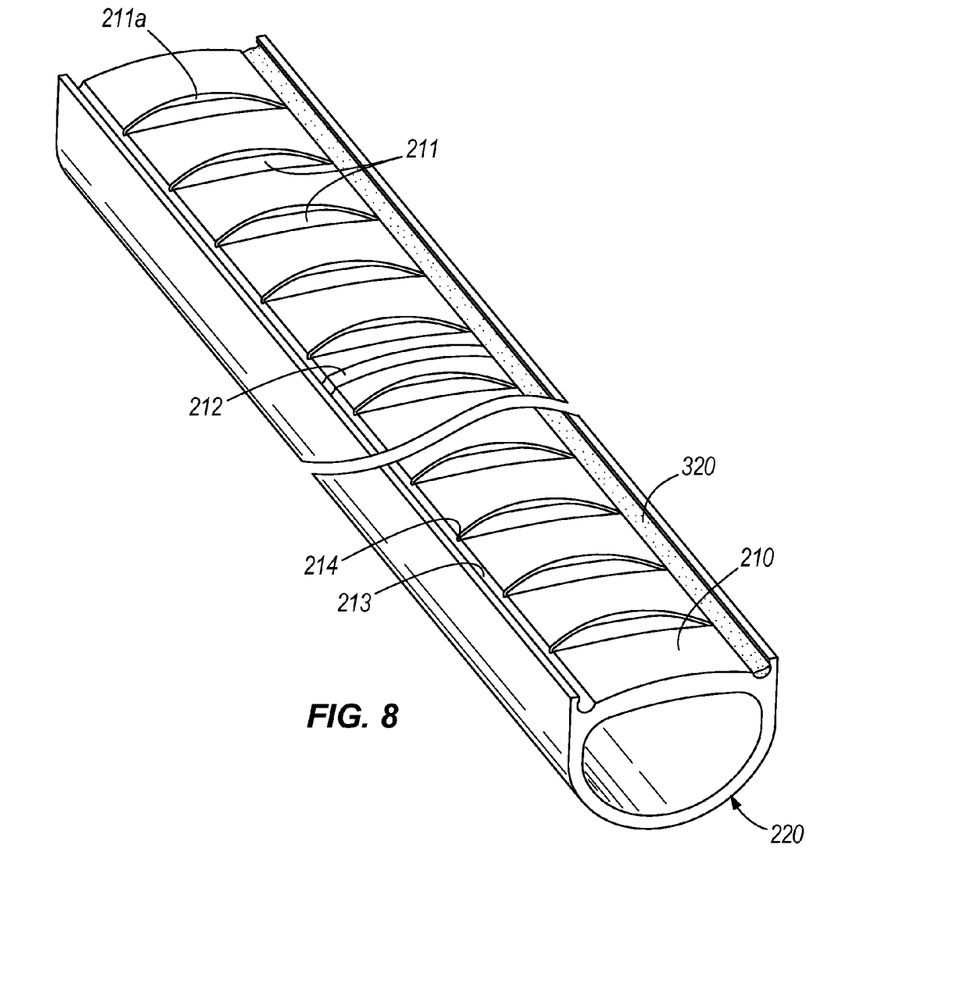
FIG. 8 is a perspective view showing another embodiment of the filler metal that is installed in the header pipe.
Figure 9:
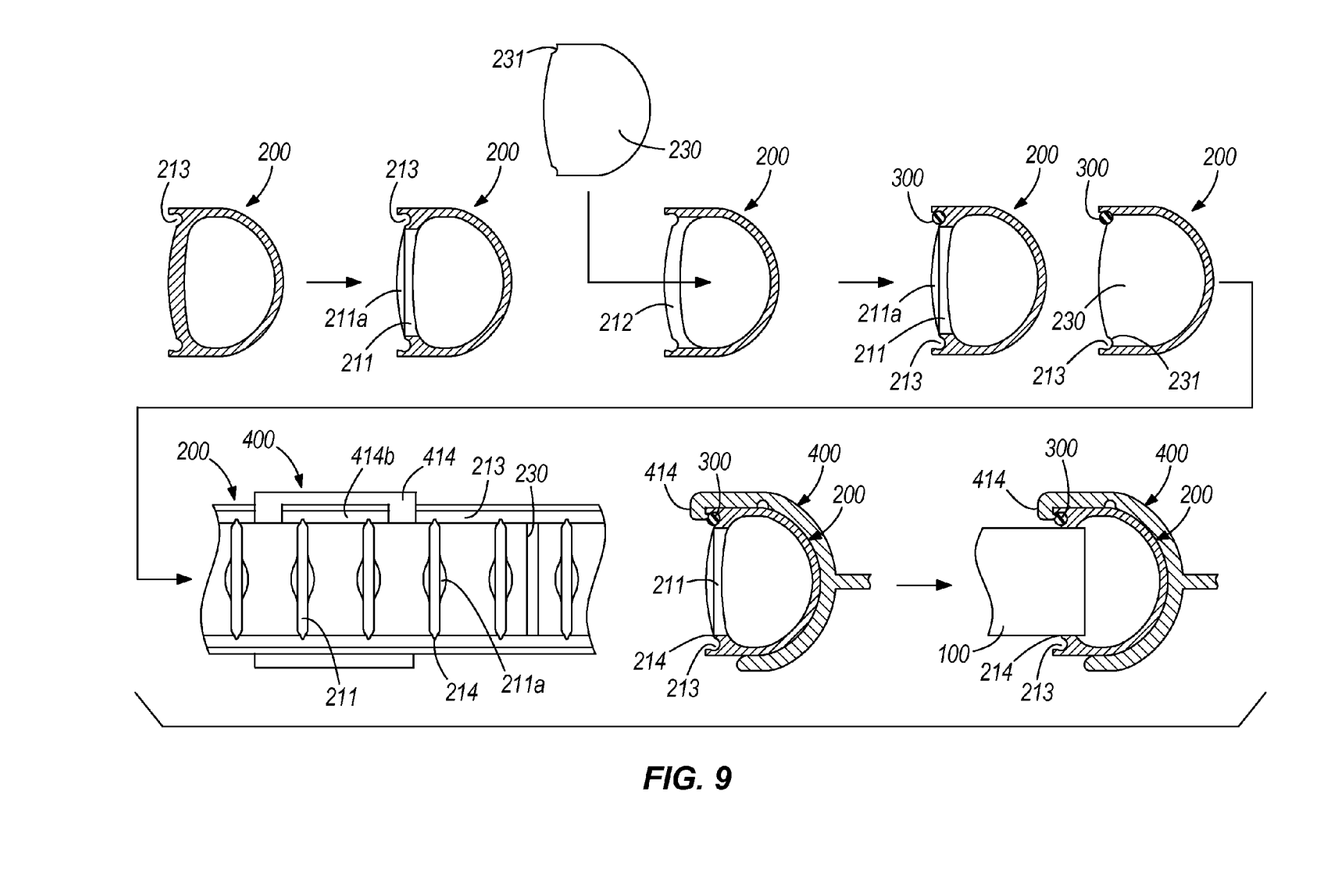
FIG. 9 is a process diagram showing the brazing fusion process for the tube and header pipe of the heat exchanger according to the present invention.

As illustrated in FIG. 1 and FIG. 2, the heat exchanger header pipe (200) according to the present invention can be applied to a condenser used in air conditioning, etc., a radiator for evaporator and engine cooling, a water heater based on engine coolant, an oil cooler for engine and machine oil cooling, etc. and it is preferably used for the condenser for air conditioning, and such a heat exchanger (H) is comprised of a pair of header pipes (200) and a plurality of tubes (100) that are installed in between the pair of header pipes (200) in a length direction, and it is the feature of the present invention that the plurality of tubes (100) installed in between the pair of header pipes (200) may be easily fused by brazing with respect to the header pipe (200). FIG. 3 is a front view showing a configuration of the header pipe according to the present invention; FIG. 4 is a cross-sectional view of FIG. 3 along the line I-I; FIG. 5 is a cross-sectional view showing another shape of the header pipe; FIG. 6 is an enlarged cross-sectional view illustrating enlarged key parts of a header pipe; FIG. 7 is a cross-sectional view showing the joined structure of a header pipe and a bracket; FIG. 8 is an oblique view showing another example of the filler metal that is installed in the header pipe; and FIG. 9 is a process diagram showing the brazing fusion process for the tube and header pipe of the heat exchanger according to the present invention.

As illustrated in FIG. 3 to FIG. 8, the present invention is largely comprised of a header pipe (200) that provides an assembly face of a plurality of tubes (100), a filler metal (300) that is inserted and installed in the header pipe (200), and a bracket (400) that joins with the header pipe (200) in a removable mode.

The header pipe (200) is comprised of a header plate (210) that provides an assembly face with the tube (100) and a header body (220) that is extended at both ends of the header plate (210). On the assembly face of the header plate (210), holes are punched for a tube insertion hole (211) intended for insertion of the tube (100) and a baffle (230) and a baffle insertion hole (212) with an appropriate gap, and on the edge of the assembly face, a filler metal groove (213) is formed in a length direction on one end or both ends separated from the inlet of the tube insertion hole (211).

While such a header plate (210) is also formed in a flat plate form, it is preferred that it be formed in a streamlined form with its middle end projecting outside in a concave mode so that its assembly characteristic with the tube (100) may be improved.

The header body (220) is of the structure in which both ends of the header plate (210) are extended so as to form the space inside, and as illustrated in FIG. 4 and FIG. 5, it is comprised of a top part (221) whose both ends are processed to smoothen the surface and a connection part (222) in a half moon shape that connects with the top part (221), wherein its entire appearance may take various forms including D shape, circle, and oval depending upon the form of the connection part (222).

In the present invention, in order to reduce its raw material cost for the header pipe (200), a sheet material with an already-clad filler metal (300) is not used, but the header pipe (200) that is formed by extrusion or extrusion drawing is used, and a welding rod (310) that is used as the filler metal (300) after being inserted and installed in the filler metal groove (213) formed on one or both ends of the header pipe (200) melts and flows following the contact area of the tube (100) with the tube insertion hole (211) to carry out the brazing fusion.

In the present invention, the material of the header pipe (200) is aluminum of No. 3,000, No. 6,000, and No. 7,000 series, and while their fusion points differ somewhat depending on the alloy compositions and reach approximately 640, the welding rod (310) used for the filler metal (300) is No. 4,000 series of aluminum-silicon alloy, and 4343, 4045, 4047, etc. are mostly used, and the range of their fusion points is 570-595° C. so upon introduction into a brazing furnace at approximately 600° C., the welding rod (310) becomes molten, and because the molten welding rod (310) flows toward the assembly part of the tube (100) and header pipe (200), brazing fusion can take place. While the welding rod (310) is limited to the filler metal (300) to describe the present invention, it is not limited to it, but it may consist of the paste materials (320) in a half-circle form that is filled in the filler metal groove (213) and dried as illustrated in FIG. 8 in addition to the welding rod (310).

In addition, in the present invention, the filler metal (300) must be introduced into a brazing furnace by being in a top-located position so that the filler metal (300) can smoothly flow upon the brazing fusion. That is, only when the filler metal (300) is located at the top of the header pipe (200), the filler metal (300) can naturally flow down into the assembly part of the tube (100) and header pipe (200) by the gravity and capillary tube phenomena upon its melting, and the header pipe (200) supports the header pipe (200) in the brazing furnace with stability by using a certain bracket (400).

In addition, in the case of the heat exchanger in which the tube (100) is comprised of at least 2 columns, it may have a structure in which on one or both sides in each the tube (100) row, a filler metal groove (213) is respectively formed to fix the filler metal (300).

On the other hand, as illustrated in FIG. 6, the filler metal groove (213) is formed to be larger than a half-circle so that at least half of the outer diameter of the filler metal (300) can be inserted, and as illustrated in FIG. 2, on the baffle (230) a cut-open groove (231) is formed at a location corresponding to the filler metal (213) so that it may not interfere with the insertion of the filler metal (300). Therefore, because the filler metal (300) is pressed and inserted into the filler metal groove (213), the filler metal (300) can be prevented from breaking away during its transporting and feeding processes, and because a certain gap is formed between the tube (100) and filler metal (300) as illustrated in FIG. 6, there is the advantage wherein the interference by the filler metal (300) can be prevented upon inserting the tube (100) so its assembly characteristic is improved.

On the other hand, as illustrated in FIG. 6, the center of the filler metal groove (213) is deployed to advance toward the assembled end part of the tube (100) with header pipe (200) so that the filler metal (300) of the filler metal groove (213) can smoothly flow down toward the assembly part of the tube (100) and header pipe (200) upon melting. Therefore, the filler metal (300) that is melting can naturally flow down toward the assembled part of the tube (100) and header pipe (200) by gravity and capillary tube phenomena and undergo fusion.

In addition, in the present invention, a lead groove (214) is additionally furnished that connects between the tube insertion hole (211) and the filler metal groove (213), and the molten filler metal (300) flows down toward the assembly part of the tube (100) and header pipe (200) by using the lead groove (214) as a pathway.

That is, as the filler metal (300) melts due to a high brazing temperature, the filler metal (300) flows suddenly in large quantity, so the filler metal (300) may not be delivered evenly to the assembly part. Therefore, the lead groove (214) that connects between the filler metal groove (213) and tube insertion hole (211) is formed, and an appropriate quantity of the filler metal (300) is allowed to flow smoothly around the contact area between the tube (100) and tube insertion hole (211) so that it can be evenly delivered around the entire contact area between the tube (100) and tube insertion hole (211).

At this time, the lead groove (214) is formed with the filler metal groove (213) side being formed to be narrow and its tube insertion hole (211) side being formed to be wide so that an appropriate quantity of the filler metal (300) can flow down without discontinuance, so its structure is preferred such that gradual expansion is achieved from the filler metal groove (213) to the tube insertion hole (211). That is, in case the size of the lead groove (214) is identical, a large quantity of the filler metal (300) flows down suddenly so that the fusion area is not uniformly fused, and there is also the problem wherein discontinuance of the fused area occurs. However, when the lead groove (214) is formed with the filler metal groove (213) side formed narrow and its tube insertion hole (211) side formed wide, the molten filler metal (300) does not suddenly flow into the lead groove (214) in large quantity because the inlet of the lead groove is narrow. And because its outlet side is wide, an appropriate quantity of the filler metal (300) can continue to be supplied without discontinuance, entire internal and external contact areas surrounding the tube (100) and tube insertion hole (211) can be evenly fused, and appearance of the fused area can also be improved. Moreover, formation of the lead groove (214) between the filler metal groove (213) and tube insertion hole (211) is applicable to the important feature of the present invention.

At this time, while the lead groove (214) can have a configuration as illustrated in FIG. 5 in which a certain part between the tube insertion hole (211) and filler metal groove (213) is caved in to take a groove (224) form, it is preferred that it be formed to allow penetration in its internal direction like the tube insertion hole (211). That is, if the lead groove (214) allows penetration inside, the filler metal (300) flowing down the contact surface of the tube insertion hole (211) can flow down outside the contact area between the tube insertion hole (211) and tube (100) and also flow down inside so assembly characteristics of the tube (100) can be further maximized.

In addition, as illustrated in FIG. 8, on the middle end of the tube insertion hole (211), an expansion groove (211a) in a groove form is formed in which the corresponding parts are caved in a concave form over a certain area. Because it can improve on the assembly characteristics of the tube (100) and also fusion characteristics of the tube (100), if the expansion groove (211a) is formed on the part of the middle end of the tube insertion hole (211) whose fusion characteristics may become weak relatively, that part can accept much more filler metal (300) so that the contact area with the tube (100) also becomes wider, which can secure sturdier assembly performance.

In the header pipe (200) according to the present invention, a certain bracket (400) is installed in a removable structure on the outer circumference of the header pipe so that stable support may be implemented upon the introduction into a brazing furnace.

As illustrated in FIG. 2 or FIG. 7, the bracket (400) is comprised of a support part (410) that is formed so as to surround a part of the header body (220) comprising the header pipe (200) and a clamping part (420) with a plurality of fixed cavities (421) connected with the outside of the support part (410) and can be fixed with respect to an object to be fixed. At this time, the support part (410) of the bracket may be connected with a clamping member in various forms including a refrigerant tube.

The support part (410) is comprised of a sitting part (411) in a form that corresponds to the connection part (222) of the header body (220), a first support part (412) that extends from one side of the sitting part (411) and supports one end of the top part (221) of the header body (220), and a second support part (413) that extends from another side of the sitting part (411) and supports another end of the top part (221) of the header body (220), wherein on the terminal end of the first support part (412) or second support part (413), a catch part (414) with a jaw (414a) is extended and formed that is intended to be caught at one end of the header plate (210).

In addition, on the catch part (414), an escape groove (414b) is formed that exposes the filler metal (300) to the outside. That is, because the catch part (414) blocks the filler metal (300), a temperature difference arises between the part blocked by the catch part (414) and the part not blocked so the filler metal (300) may not melt consistently. To prevent it, the middle end part of the catch part (414) that is not required is allowed to escape partially so that the temperature difference of the filler metal (300) may not take place, and only the part that does not escape is caught at one end of the header plate (210) to support the header pipe (200).

In addition, as illustrated in FIG. 7, on the bracket (400), an elastic groove (415) is formed that is intended to provide an appropriate elastic force upon binding with the header body (220). The elastic groove (415) is formed inside a boundary area between the sitting part (411) and the support parts (412) (413), and a part of the entire thickness is caved in to vary the thicknesses so as to afford an appropriate elastic force. Accordingly, binding with the header plate (220) can be accomplished in a removable mode.

At this time, a filler metal or filler metal sheet that is coated on the header body (220) is inserted between the header body (220) and bracket (400), and while the filler metal is melting in a brazing furnace, the header body (220) and bracket (400) undergo fusion by brazing. That is, while in order to install the bracket (400) in the header pipe (200), a separate clamping means comprising a bolt, etc. is typically used to tentatively join the header pipe with the bracket, and a filler metal in a sheet form is inserted between the header pipe and bracket to carry out brazing upon brazing the tube. However, because the bracket (400) can be clamped with the header pipe (200) in a removable mode in the present invention, clamping can be accomplished with a separate clamping means as in the past.

The following describes the brazing fusion method based on the heat exchanger header pipe (200) that is furnished with the filler metal groove with the configuration above according to the present invention.

FIG. 9 is a process diagram showing the brazing fusion process for the heat exchanger tube and header pipe according to the present invention. As illustrated in FIG. 9, the brazing method based on the heat exchanger header pipe (200) according to the present invention comprises a step in which a header pipe (200) furnished with a filler metal groove (213) is formed in an extrusion or extrusion drawing process, a step in which a tube insertion hole (211) and a baffle insertion hole (212) that includes a caved lead groove (224) or a feed-through lead groove (214) is processed in the header pipe (200); a step in which a baffle (230) that is furnished with a cut-open groove (231) in the baffle insertion hole (212) of the header pipe (200) is assembled; a step in which a filler metal (300) is inserted into the filler metal groove (213) of the header pipe (200); a step in which a bracket (200) with a formed escape groove (414b) is assembled in the header pipe (200); a step in which a tube (100) is assembled into the tube insertion hole (211) of the header pipe (200); and a step in which the filler material (300) is melted to fuse the assembly part of the header pipe (200) and tube (100).

The following describes the brazing method according to the present invention in further detail.

(First Step)

While a header pipe (200) made of aluminum or an aluminum alloy is formed in an extrusion or extrusion drawing process, a filler metal groove (213) is formed on one or both ends of the assembly face of the header pipe (200) in a length direction so as to insert the filler metal (300).

(Second Step)

In order to enable assembling the tube (100) on the assembly face of the header pipe (200), a baffle insertion hole (212), into which a tube insertion hole (211) including a caved lead groove (224) or a feed-through lead groove (214) and a baffle (230) intended to configure a flow path inside the header pipe (200) are assembled, is press processed to arrange and form with an appropriate interval on the assembly face of the header pipe (200).

At this time, it is preferred that the lead grooves (214) (224) are formed in a structure that allows gradual expansion from the filler metal groove (213) to the tube insertion hole (211) side so that the flow of the filler metal (300) may be kept smoother and evenly delivered over the entire contact area between the tube (100) and tube insertion hole (211). In addition, on a part of the middle end of the tube insertion hole (211), an extension groove (211a) is formed in which a corresponding part is caved in, and it is configured to widen the fused area with the tube (100) when the filler metal (300) melts and flows down.

(Third Step)

While a baffle (230) intended to configure a flow path is inserted and assembled into the baffle insertion hole (212) that is furnished on the assembly face of this header pipe (200), a cut-open groove (231) is formed in advance on the baffle (230) that corresponds to the filler metal groove (300) so that the filler metal (300) may be smoothly inserted upon inserting the filler metal.

(Fourth Step)

On both ends of the header pipe (200) with which the baffle (230) has been assembled, caps (240) are assembled for flow path configuration.

(Fifth Step)

A welding rod (310) that plays the role of a filler metal (300) upon brazing with a filler metal groove (213) that is furnished with a header pipe (200) is pressed and inserted or a paste material (320) in a powder form is filled in the filler metal groove (213) and dried.

(Sixth Step)

A tube (100), a header pipe (200), radiating fins (not illustrated), side plate (not illustrated), etc. that comprise the condenser of a heat exchanger (H) are assembled, a clamping bracket (400) is assembled with the header pipe (200), and a brazing filler metal of sheet material is inserted. On the bracket (400), a catch part (414) is formed so that one end of the filler metal groove (213) of the header pipe (200) may be caught, and on the catch part (414), an escape groove (414b) is formed that exposes the filler metal (300) to the outside so that both ends of the catch part (414) may be placed on one end of the filler metal groove (213) when the bracket (400) is assembled.

(Seventh Step)

Flux for brazing is coated before an assembled heat exchanger (H) is introduced into a brazing furnace. At this time, it is preferred that flux is coated on brazing areas of the header pipe (200) and tube (100) and also brazing areas of the tube (100) and radiating fins (not illustrated).

(Eighth Step)

Any moisture included in the flux that has been coated on brazing areas of the header pipe (200) and tube (100) and also brazing areas of the tube (100) and radiating fins (not illustrated) is dried.

(Ninth Step)

When the heat exchanger (H) assembly is introduced into a brazing furnace at about 600° C. after drying flux, the filler metal (300) begins to melt and then flows into the assembly part of the header pipe (200) and tube (100) by gravity and capillary tube phenomena until brazing fusion takes place. At this time, the bracket (400) is used to support and fix the heat exchanger (H) assembly in a brazing furnace with stability so that the filler metal (300) inserted into the header pipe (200) may face the top side as it is joined with the header pipe (200).

Therefore, according to the present invention, it has the advantage of enabling to fuse the assembly part of a header pipe (200) and a tube (100) by brazing more easily, and because brazing may be carried out easily, it has the advantage wherein assembly characteristics of a header pipe (200) and a tube (100), and brazing fusion performance can be greatly improved.

In addition, because a header pipe (200) is formed in an extrusion or extrusion drawing process according to the present invention, it has the advantage of reducing the material cost, and because a filler metal (300) such as a welding rod (310) or paste material (320) of low material cost is used to fuse the header pipe (200) with the tube (100), it has the advantage of reducing the cost of the filler metal (300), and provides the advantage wherein brazing defect rates incurred by brazing fusion can be greatly reduced structurally.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A heat exchanger having a header, the heat exchanger comprising:
   a plurality of tube insertion holes, each shaped to receive an end of a tube therein,
   a filler metal groove spaced a distance from the tube insertion hole and extending substantially the length of the header,
   a plurality of lead grooves, each extending between the filler metal groove and a corresponding one of the plurality of tube insertion holes to provide a sole fluid path therebetween, and
   a filler metal insert completely contained within the filler metal groove so that, with a rising temperature, melted filler metal flows from the filler metal grove, through the plurality of lead grooves, and down around a contact area of the tube and the tube insertion hole so as to allow fusion, and wherein each lead groove is sized to meter the flow of filler material into a corresponding tube insertion hole,
   wherein a portion of at least one of the plurality of the tube insertion holes expands outwardly to provide additional clearance between the tube and the tube insertion hole.

2. The heat exchanger of claim 1, wherein a width of the lead grooves varies between the filler metal groove and the tube insertion hole.

3. The heat exchanger of claim 1, wherein the lead groove has a structure in which a part between the tube insertion hole and filler metal groove allows straight penetration, and it is formed such that gradual expansion takes place from the filler metal groove to a tube insertion hole side.

4. The heat exchanger of claim 1, wherein the header is additionally furnished with a plurality of baffle insertion holes into which a baffle is inserted to direct the flow of fluid within the header.

5. The heat exchanger of claim 1, wherein the header includes a header plate that provides a fusing face upon brazing with the tube, and a header body that is extended on both ends of the header plate so that internal space may be formed, wherein a bracket is installed in a removable mode so that the header body may be supported with stability during brazing.

6. The heat exchanger of claim 1, wherein the filler metal groove is in fluid communication, via a plurality of lead grooves, with each tube insertion hole defined by the header.

7. The heat exchanger of claim 6, wherein the lead grooves control the flow of filler metal from the filler metal groove so a substantially equal amount of filler metal is provided to each tube insertion hole.

8. The heat exchanger of claim 1, wherein the filler metal groove is in fluid communication with at least two non-adjacent tube insertion holes.

9. A heat exchanger having a header, the heat exchanger comprising:
   a header plate that provides a fusing face with a tube for brazing, and
   a header body that is extended to both ends of the header plate so as to form an internal space,
   wherein the header plate defines a plurality of tube insertion holes, each configured to receive a corresponding tube, and a filler metal groove spaced a distance from the tube insertion holes and containing all the filler material therein, wherein a lead groove extends between each tube insertion hole and the filler metal groove to provide the lone fluid path therebetween, and wherein the lead groove is sized to meter the flow of filler material between the tube insertion hole and the filler metal groove,
   wherein a middle portion of the tube insertion hole expands outwardly to provide a larger clearance between the tube and the corresponding tube insertion hole.

10. The heat exchanger of claim 9, wherein the width of the lead groove varies as it extends between the tube insertion hole and the filler metal groove.

11. The heat exchanger of claim 9, wherein the lead groove has the structure in which a part between the tube insertion hole and filler metal groove allows straight penetration, and it is formed such that gradual expansion takes place from the filler metal groove to the tube insertion hole.

* * * * *

UNITED STATES PATENT AND TRADEMARK OFFICE
CERTIFICATE OF CORRECTION

| | | |
|---|---|---|
| PATENT NO. | : 8,020,607 B2 | Page 1 of 1 |
| APPLICATION NO. | : 12/106015 | |
| DATED | : September 20, 2011 | |
| INVENTOR(S) | : Kim et al. | |

It is certified that error appears in the above-identified patent and that said Letters Patent is hereby corrected as shown below:

On the title page item (73) insert --UM HITEC Co., Ltd. Gyeonggi-do (KR)--.

Signed and Sealed this
Fifteenth Day of December, 2015

Michelle K. Lee
*Director of the United States Patent and Trademark Office*